United States Patent [19]

Stuart

[11] 4,041,466

[45] Aug. 9, 1977

[54] MULTI-AXIS ENCODER PROCESSING AND DISPLAY SYSTEM

[75] Inventor: Robert W. Stuart, Bedford, Morocco

[73] Assignee: Dynamics Research Corporation, Wilmington, Mass.

[21] Appl. No.: 650,541

[22] Filed: Jan. 19, 1976

[51] Int. Cl.² ............................................. G06F 15/46
[52] U.S. Cl. .............................. 364/900; 235/151.11; 318/574; 318/569
[58] Field of Search ............... 340/172.5; 235/151.11, 235/150.1; 445/1; 318/572-574, 569

[56] References Cited

U.S. PATENT DOCUMENTS

| | | | |
|---|---|---|---|
| 3,701,888 | 10/1972 | McDaniel | 235/150.1 |
| 3,752,969 | 8/1973 | Kiffmeyer et al. | 235/151.11 |
| 3,770,947 | 11/1973 | Deily | 235/151.11 |
| 3,790,876 | 2/1974 | Vail | 235/151.11 X |
| 3,828,318 | 8/1974 | Bennett et al. | 340/172.5 |
| 3,842,330 | 10/1974 | Kolell | 318/574 |
| 3,882,305 | 5/1975 | Johnstone | 235/151.11 |
| 3,917,930 | 11/1975 | Davey et al. | 235/151.11 |
| 3,922,671 | 11/1975 | Tripp | 235/151.11 X |
| 3,939,453 | 2/1976 | Schroeder | 340/172.5 |
| 3,941,988 | 3/1976 | Hagstrom | 235/151.11 |

Primary Examiner—Mark E. Nusbaum
Attorney, Agent, or Firm—Weingarten, Maxham & Schurgin

[57] ABSTRACT

A system for processing data from an incremental or other type of positional encoder and for displaying positional information in which individual digits are sequentially processd to provide the positional data. The invention results in simple circuitry, allows the number of axes served by the display/processor to be increased with minimal changes in processor hardware; and allows encoder movements to be displayed in different units of measurement, selectable by an operator.

7 Claims, 5 Drawing Figures

MULTI-AXIS ENCODER PROCESSING AND DISPLAY SYSTEM

FIELD OF THE INVENTION

This invention relates to systems for processing encoder data to display encoder positional information and more particularly to systems in which the encoder positional data can be selectively displayed in different units of measurement.

BACKGROUND OF THE INVENTION

Encoders for converting rotary or linear motion into digital signals representative thereof are readily available and well known in the art, and various different types of electronic circuits are available for utilizing the digital information generated by such encoders. In many applications, an encoder system is used to provide positional information that is directly displayed to an operator by means of a digital display. In particular, the use of encoders for providing digital readout of positional information for machine tools is becoming more widespread.

Encoder systems for use in machine tool applications may be required to display positional information for one, two, or more axes. Additionally, such positional readout systems frequently must be compatible with both English and metric units of measurement.

SUMMARY OF THE INVENTION

Briefly, the invention processes data from one or more positional encoders to provide a display of the encoder positions, the processor being adapted for use with different numbers of encoders and for display of position in different units of measurement. Positional data is stored in a memory for one or more axes, each of which is updated on the basis of digital information from a corresponding encoder. The data for each axis is processed one digit at a time, each digit being sequentially read from memory, appropriately processed according to signals from the corresponding encoder, and returned to its location in memory. After all the digits for one axis have been processed, the processing system proceeds to the next axis. The positional information stored for each individual axis can be set to zero or preset to a desired value by an operator by appropriately activating front panel controls. Due to the manner in which the positional data is updated in response to signals indicating movement of the corresponding encoder, positional information can be easily displayed in different, non-compatible units of measurement, such as English and metric units. The manner in which positional data is processed makes display of the positional information exceptionally simple, requiring much less circuitry than is required when using conventional methods of decoder processing circuitry.

DETAILED DESCRIPTION OF THE INVENTION

Figure 1:
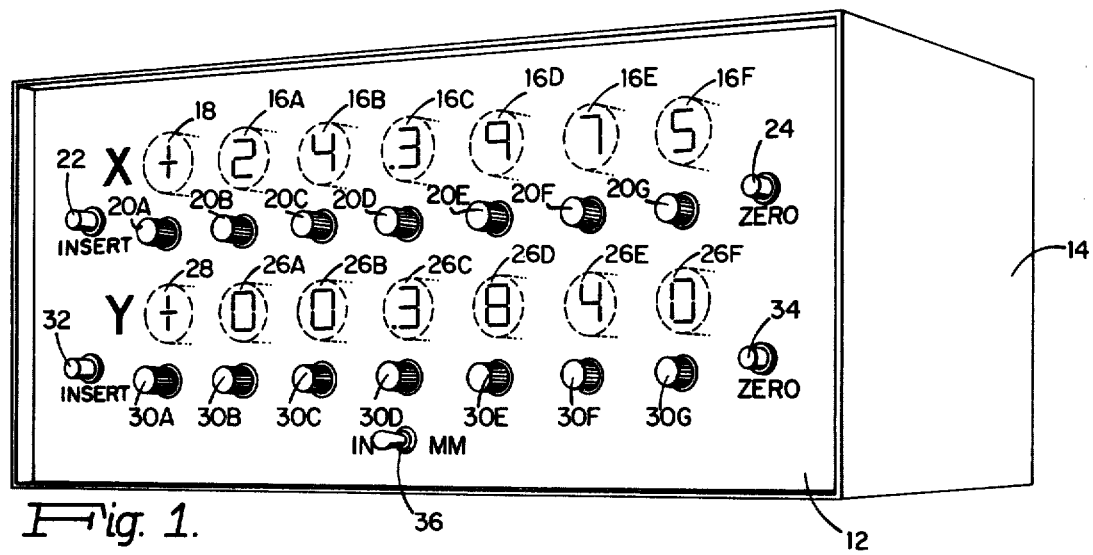
FIG. 1 is a pictorial view of a typical embodiment of the invention illustrating the display and controls available to an operator.

FIG. 1 shows an exterior view of a typical embodiment of the invention. The displays and controls available to the operator are located on a front panel 12 of an enclosure 14. The electronics for performing the processing are enclosed within the enclosure 14 and are described in detail below. The particular embodiment described hereinbelow includes a display system for displaying position on two axes, designated as the "X" axis and the "Y" axis. The display of positional information for the "X" axis consists of six display digits 16A--16F, which may be seven-segment displays as shown in FIG. 1. Also included in the display is a sign and overrange indicator 18. A value to which it is desired to preset the X axis positional readout may be selected by rotary switches 20A-20G. Pushing "INSERT" pushbutton switch 22 causes the value selected by rotary switches 20A-20G to be preset into the encoder display/processor and to be displayed upon display devices 16A-16F and 18. The "ZERO" pushbutton switch 24 allows the positional information stored in display by the encoder display/processor to be reset to zero.

The Y axis displays and controls are identical with the abovedescribed X axis displays and controls. Thus, the Y axis display contains six displayed digits 26A-26F and a sign and overrange display 28. Rotary switches 30A--30G allow the Y axis positional data to be preset to a particular value by selecting this value with rotary switches 30A-30G and pressing Y axis INSERT pushbutton 32. Y axis positional data can be set to zero by pushing ZERO pushbutton 34. Toggle switch 36 allows X axis positional data and Y axis positional data to be displayed in either English or metric units, in this case inches or millimeters. The relationship and operation of the abovedescribed controls and displays will become more clear with reference to the following description of the operation of the display/processor electronics.

Figure 2:
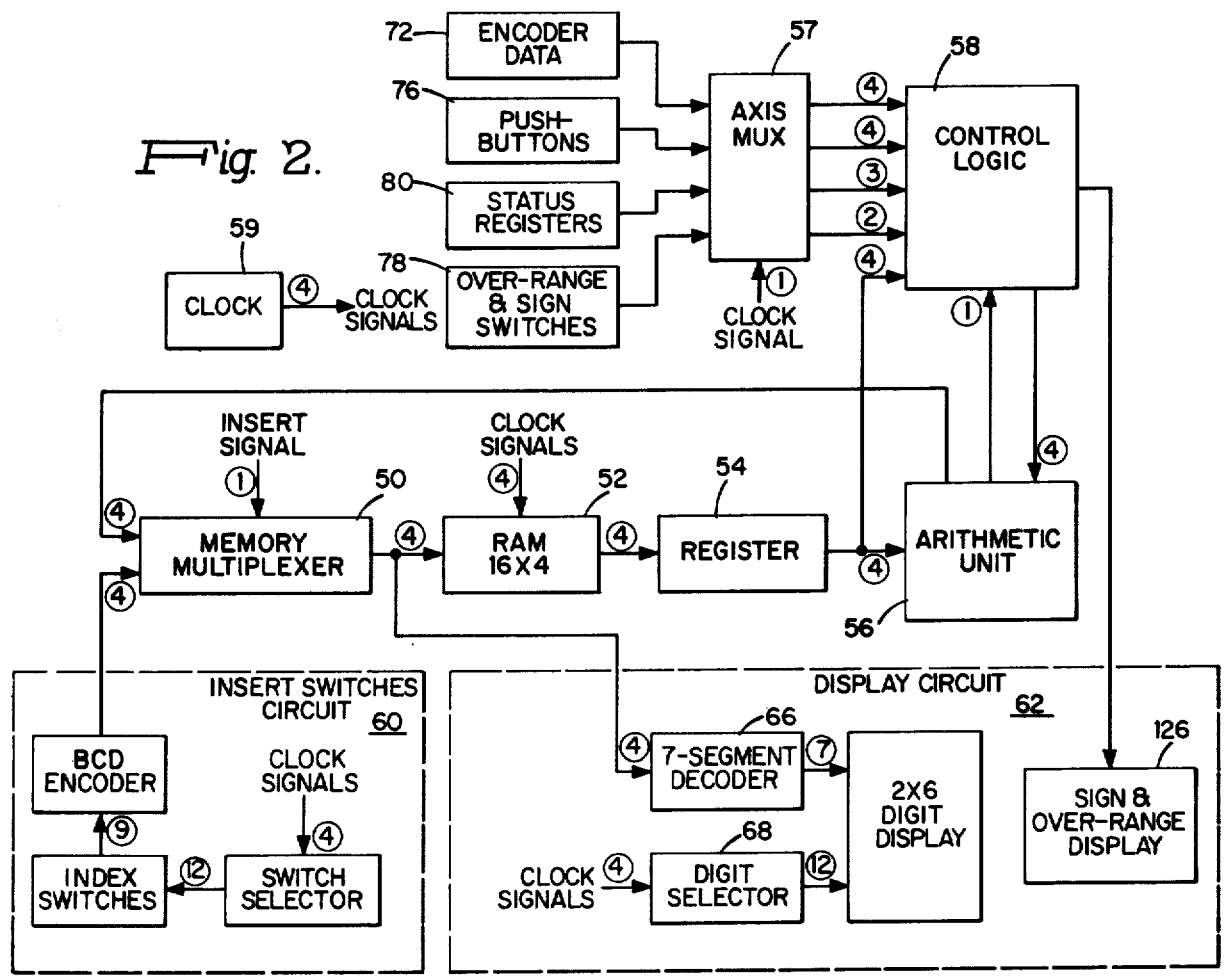
FIG. 2 is a block diagram of the processing electronics of the invention.

FIG. 2 is a block diagram of the circuitry of the invention. In this figure and in following figures, multiple signals going from one part of the system to another part are shown as single lines, and the number of individual signals denoted by each line is shown by a small encircled figure beside that line.

The particular embodiment shown in FIG. 2 and in the following figures is adapted for use with a two-axis encoder display/processor. This two-axis system can easily be modified to operate with a smaller or larger number of axes; and in fact, the simplicity with which additional axes can be added is one of the principal advantages of the invention. While the explanation of the circuit shown in FIG. 2 is for an incremental encoder, the invention can be used with encoders having absolute positional data outputs. The operation of the electronics associated with each of the axes is generally identical. Therefore, an explanation of the circuit operation for one axis will generally not be repeated, except where reference to the electronics of both axes is necessary to explain the interaction or interrelationship therebetween.

The heart of the encoder processor shown in FIG. 2 is composed of memory multiplexer 50, memory 52, register 54, arithmetic unit 56, axis multiplexer 57 and control logic 58. Data representing the current position of each axis is stored in memory 52, which might be implemented by using a random access memory as shown in FIG. 2. The positional data for each axis will consist of a number of BCD digits. To begin processing the data from one axis, the least significant digit is read from memory 52 into register 54 where it is temporarily stored for further operations by arithmetic unit (AU) 56. The output of register 54 is a four-bit, BCD digit and is applied to AU 56. In response to signals from the encoder indicating movement or non-movement thereof, control logic 58 applies the appropriate signals to arithmetic unit 56 to increment or decrement the digit in register 54 by the proper amount. The output of AU 56 is applied to memory multiplexer 50. Normally, the AU output is connected to the output of memory 52 by multiplexer 50 and the updated digit is stored in memory 52 after which the entire process is repeated for each of the remaining digits for the particular axis being processed. Then data from the next axis is similarly processed. The updating of all of the digits in all of the axes is called a process cycle.

Encoder data 72 is applied to axis multiplexer 57. Also applied to axis multiplexer 57 are signals from insert and zero pushbuttons 76, signals from overrange and sign switches 78, and signals from status registers 80, described in more detail below. Axis multiplexer 57 selects the proper signals for the axis currently being processed from the signals applied to it and connects these signals to control logic 58. Since the processing of data from each axis is the same, it is not necessary to change control logic 58 for applications requiring a different number of axes for encoder data. Of the primary parts of the invention, only axis multiplexer 57 and the signal sources connected to it need to be modified. This is an important advantage of the invention in that the capabilities of the processor can easily be expanded while most of the processor hardware remains unchanged.

In response to an insert signal from the front panel, memory multiplexer 50 connects outputs from the front panel index switches to the input of memory 52. When this happens, the value to be preset into the processing circuitry as selected by the front panel switches is stored in memory 52 in place of the AU output data.

The positional data displayed on the front panel is taken from the output of memory multiplexer 50. The data at this point in the circuit is composed of sequential, four-bit BCD digits corresponding to positional data for each of the axes. This information is applied to display circuit 62. Since the data is already in serial form, a minimum of electronics is required to display the data, using well known multiplex display techniques. The data coming from memory multiplexer 50 is applied to a seven-segment decoder 66. The display consists of two lines of six digits each, and corresponding segments of each digit in the display are all connected together so that the output of seven-segment decoder 66 is simultaneously applied to the proper segment of each digit. In response to signals from clock 59, digit selector 68 causes the proper digit in the display to be enabled, thus displaying the correct digit. As each digit is present at the output of multiplexer 50, it is displayed, as described above, resulting in all digits being sequentially displayed so rapidly that the display appears to be continuous.

Clock 59 provides clock signals for each of the parts of the system and provides signals indicating which digit is being processed at each point in time. The embodiment shown in FIG. 2 processes data from two axis having eight digits each for a total of sixteen digits. Thus, the signals from clock 59 must indicate which one of 16 digits is being processed at any particular point in time. This could be simply done, for example, by means of a simple four-bit, binary signal indicating states 1-16 as in FIG. 2. The necessary clock signals to indicate the digits being processed are selected from the outputs of clock 59 and applied to each of the parts of the system requiring timing data. For example, some system blocks only require data indicating which axis is currently being processed. In this case, only the most significant bit indicating which axis is being processed need be applied to that block. Other parts of the system require complete timing information, and all four clock signals are applied to these blocks. This is explained in more detail below.

In many applications, the speed at which the encoder processing circuitry can respond to encoder movement is important. In these applications, clock 59 and the processing circuitry will operate at as high a frequency as is practical. A typical clock frequency for a two-axis system displaying six digits plus overrange and sign data for each axis is 800 KHz. The frequency at which the sequential signals appear at the output of memory multiplexer 50 is determined by the frequency of clock 59. Some types of displays which are suitable for use with the invention will not operate at these frequencies, such as plasma type displays. If this type of display is used, a display register can be inserted between the output of memory multiplexer 50 and seven-segment decoder 66. By doing this, each digit present at the output of memory multiplexer 50 can be stored in the display register for a period of time extending over many process cycles, thus enabling the signals applied to the display to be maintained for the required length of time. When this is done, a display counter must also be inserted between the clock signals and digit selector 68 to provide the proper signals to digit selector 68 so that the proper digit is enabled by the signals from digit selector 68. Circuitry for implementing the display register and the display counter in any particular application would be obvious to one of ordinary skill in the art.

Figures 3, 4, 5:
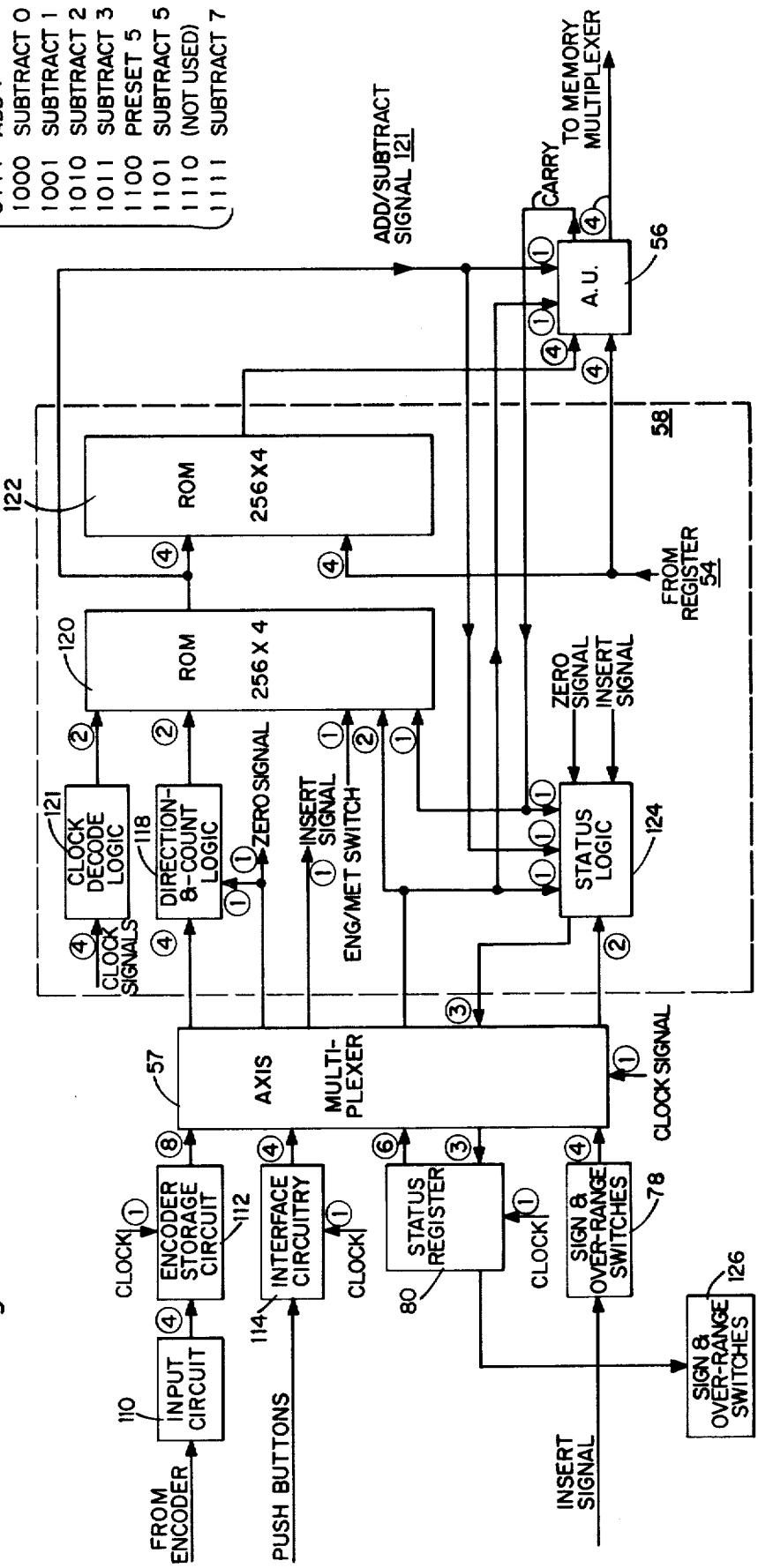
FIG. 3 is a diagrammatic representation of the storage format of positional values which is useful in explaining the operation of the invention.
FIG. 4 is a detailed block diagram of the control logic shown in the circuit of FIG. 2.
FIG. 5 is a representative list of arithmetic operations and corresponding digital codes therefor which may be performed upon the digital positional information by the processing electronics of the invention.

FIG. 3 is useful in explaining the operations performed on the stored positional data by AU 56. The positional data for each axis is stored as an eight-digit number denoted by 100A through 100H in FIG. 3. The six most significant digits of this value 100A through 100F are displayed, as shown in FIG. 1. The two least significant digits 100G and 100H are not displayed and are used for purposes explained below. In the particular embodiment to be explained, the smallest increment of motion detectable by the encoder will be taken to be 0.0005 inches. In English mode, the six digits displayed are composed of two digits to the left of the decimal point and four digits to the right of the decimal point as shown representatively by value 102. When the encoder display system is displaying the encoder position in English units, each 0.0005 inch increment of movement causes the value 500 to be added or subtracted to the eight-digit positional value stored in the system. This is shown diagrammatically in FIG. 3 by line 104, and will produce a change which is reflected by the displayed digits.

When the encoder processing system is in metric mode, the operation of the system is slightly different. The encoder still indicates movement in quanta of 0.0005 inches. This must be converted to metric units. Note that 0.0005 inches equals 0.0127 millimeters. By adding or substracting 127 to the stored value for each 0.0005 inch increment indicated by signals from the encoder and shifting the decimal point two digits to the right, the six-digit value display will indicate the encoder positions in hundreds of millimeters rather than in ten thousandths of inches. This is shown in line 106 of FIG. 3. Note that the last two digits 100G and 100H which are not required when the processor system is in English mode are required in metric mode even though these two digits are not displayed.

While the above is a simplified description of the operation of the invention, it is helpful in pointing out the advantages of the invention. First, by processing each of the digits serially, the AU need only be capable of processing a single digit at a time.

Second, because of the way in which the data is processed by the invention, both additional resolution in the form of additional digits and data from additional axes can be easily added to the system with minor modifications. The principal change which must be made to accommodate such enlargements is adding additional capacity to memory 52 and modifying clock 59 to provide for the additional digits to be processed. These changes are relatively simple and inexpensive to implement. Once the memory capacity has been enlarged, the basic processing circuitry comprised of control logic 58, memory multiplexer 50, memory 52, register 54, and AU 56 functions as it did previously. Switches for inputting index information and display circuitry can be added for the additional information, or the circuitry shown in FIG. 2 can be switched between axes, as desired.

Third, since the circuit of FIG. 3 causes a particular value to be added to the positional data stored for each axis, the capability for displaying positional information in non-compatible units can be easily implemented by changing the value added to the stored data by AU 56 in response to incremental signals from the encoder. An example of this is the dual English/metric unit capability described above.

Fourth, the positional data present at the output of multiplexer 60 is in a form which makes its display especially simple. Due to constraints well known to those in the art, displaying large numbers of digits is preferably done by multiplexing each of the digital values into a decoder/driver circuitry connected to all digits and then sequentially enabling individual digits at the proper time. With counter-type of encoder display systems, this requires a large amount of electronics dedicated solely to the display function. As shown in FIG. 2, the digital data present at the output of multiplexer 50 is in a form which allows it to be used to directly drive the individual digits and which requires a minimum of display interface circuitry.

In contrast with the processing system of this invention are counter types of encoder processor/display systems which are now commonly used. In these counter-type systems, a bidirectional counter is clocked in one direction or the other in response to outputs indicating incremental movements of the encoder. This type of system requires a multi-stage, bidirectional counter dedicated to each axis. It is extremely difficult to design such a system which allows an operator to select between different units for displaying the encoder position in response to encoder incremental signals of a fixed value. To display the positional values stored in the bidirectional counters, a substantial amount of circuitry is required, including many multiplexers and control circuitry.

FIG. 4 is a circuit diagram showing further details of control logic 58 and accompanying circuitry. The encoder output signals are applied to input circuit 110. Input circuit 110 amplifies and processes the encoder output data to produce two signals from each axis corresponding to quadrature encoder signals. These signals are applied to encoder storage circuit 112. Data registers in encoder storage circuit 112 are clocked once every process cycle to store the quadrature output information from each axis. The outputs of storage circuit 112 are signals corresponding to the quadrature outputs from each axis for the current process cycle and for the previous process cycle, and these outputs are applied to axis multiplexer 57.

Index and zero signals for each axis from the front panel pushbuttons are applied to interface circuit 114 which processes, debounces, and synchronizes the signals from the pushbuttons. These signals are then applied to axis multiplexer 57. Status register 80 contains the three status bits for each axis, the purpose of which is described below, and these status bits are also applied to axis multiplexer 57. The outputs from the front panel sign and overrange switches are also applied to axis multiplexer 57. In response to the proper clock signals, as described above, axis multiplexer 57 selects the appropriate signals for the axis whose data is currently being processed and applies them to control logic 58.

Four signals corresponding to quadrature outputs from an axis for the current process cycle and for the previous process cycle, are applied to direction-and-count logic 118. From these signals, it can be determined whether the encoder has moved during the previous process cycle and in which direction the movement has occurred. Additionally, an output from axis multiplexer 57 corresponding to the zero signal from the front panel pushbutton for the axis currently being processed is applied to direction-and-count logic 118. In response to these inputs, direction-and-count logic 118 generates a two-bit digital signal indicating one of four possible operations which are to be performed on the positional value being processed: (1) add a value corresponding to a one-bit encoder forward movement; (2) subtract a value corresponding to a one-bit encoder backward movement; (3) do nothing, corresponding to no encoder movement; or (4) set the position data to zero in response to a zero command. These outputs are applied to address inputs to read-only-memory (ROM) 120.

Signals from clock 59 are applied to clock decoder logic 121. In response to these signals, clock decoder logic 121 generates a two-bit digital signal indicating when particular digits of the positional information for any axis are being processed. These are: the least significant digit 100H, the second least significant digit 100G, the third least significant digit 100F, or any other digit 100A-100E. These two bits are applied to the address inputs of ROM 120. Other signals applied to the address inputs of ROM 120 include: the output of the English/metric switch signal, the negative overflow bit and the sign bit for the axis being processed from status register 80, and the carry/borrow bit from AU 56.

Returning to FIG. 3, it can be seen that AU 56 performs only a limited number of functions. These operations will now be analyzed to determine just exactly which operations the AU will be required to perform.

Referring to line 104, it can be seen that when the encoder processing system is in English mode, no change will be made to either of the least two significant digits denoted by 100G and 100H. In response to a positive or negative encoder movement, digit 100F will be incremented or decremented by 5, otherwise no change is made in digit 100F; and digits 100A-100E may be incremented or decremented by 1 in response to carry or borrow signals generated from processing lesser significant digits, otherwise these digits will not be changed.

Referring to line 106, it can be seen that when the encoder display system is in metric mode, only the following functions will be required. Least significant digit 100H may be: incremented by 7, in response to a positive encoder movement; decremented by 7, in response to a negative encoder movement; or no change made, in response to no encoder movement. The second least significant digit 100G may be: incremented by 2 or decremented by 2 in response to a positive or negative encoder movement when no carry or borrow signal is generated by the previous digit; incremented by 3 or decremented by 3 in response to the appropriate encoder movement when a carry or borrow signal is generated by the previous digit; or no change made. Third least significant digit 100F may be: incremented by 1 or decremented by 1, in response to the appropriate encoder movement when no carry is generated by the previous digit; incremented by 2 or decremented by 2 in response to the appropriate encoder movement when a carry or borrow is generated by the previous digit; or no change made. Higher order digits 100A-100E will have no change made or will be incremented by 1 or decremented by 1 in response to carry or borrow signals generated by the processing of lower order digits.

In addition to the operations described above, AU 56 may be required to set each digit to zero in response to a preset input. Additionally, when an index value is preset into the encoder processing system, the operator has no control over digits 100G and 100H. When the encoder processing system is in metric mode, the value in digits 100G and 100H, which are not displayed, is set to 50 in order to properly round off values accumulated as the result of encoder movement. Since the remaining digits displayed by the encoder processing system are preset to a particular value by directly routing the front panel switch signals to memory 52 through memory multiplexer 50, arithmetic unit 56 is not required to preset values other than zero and five.

As outlined above, control logic 58 and AU 56 need to perform only a limited number of functions on the values presented to AU 56 by register 54. In response to the eight inputs shown in FIG. 4 and described above to ROM 120, one of 14 possible operations can be selected for AU 56 to perform on the value in register 54. Thus, ROM 120 can convert the eight bits of input data into four bits of output data. This is shown in FIG. 5 where each of the 14 operations that the AU may be required to perform are listed beside one four-bit output coding which could be used to designate each operation. Note that the most significant bit of the four-bit binary code designates whether the AU is to perform an addition or subtraction operation and thus serves as an add/subtract signal which goes to AU 56. ROM 120 can be implemented with a 256 × 4 ROM.

The four-bit output of ROM 120 is applied to ROM 122. The four-bit output from register 54 is also applied to ROM 122. From these inputs, ROM 122 determines what value must be added to the value in register 54 so that the output of AU 56 will be the required value. ROM 122 can be implemented with a 256 × 4 bit ROM. AU 56 produces a four-bit BCD value which is applied to memory multiplexer 50 and a carry signal applied to ROM 120 and status logic 124.

Status register 80 stores three status bits for each axis: a sign bit, indicating the sign of the positional data for the axis; an overrange bit for the axis; and a negative overflow bit for the axis, explained below. Both the sign bit and the negative overflow bit are required during the processing of all of the digits for a particular axis. This is why these bits are stored separately in status register 80 rather than in memory 52. The overflow bit can be used to extend the capacity of the encoder processor or to indicate that the capacity has been exceeded. This bit could easily be stored in memory 52. However, because of memory sizes readily available for use in memory 52, it is frequently more economical to store this bit separately in status register 80.

At the end of the processing of the positional data for an axis, after the eighth digit has been processed, each of the status bits is updated by status logic 124 based on the three status bits for that axis, the carry bit from AU 56, and the add/subtract bit from ROM 120. For example, if after the most significant digit for an axis has been processed, the carry/borrow bit from AU 56 indicates a carry, the add/subtract signal from ROM 120 indicates add, and the sign bit from status register 80 indicates positive, the overrange bit in status register 80 should be set if it is not already set. The conditions on which the sign bit and the overrange bit are set and reset by status logic 124 and circuitry for implementing status logic 124 are obvious to one skilled in the art.

The negative overflow bit in status register 80 is required for the following reason. Assume that the positional value stored in memory 52 is very close or equal to zero, and the next signal from the encoder is such that when the positional value stored in memory 52 is operated upon by AU 56, the sign of the value will change. The change of sign or negative overflow cannot be determined by the processor until all eight digits of the positional data have been processed. Due to the manner in which the processing is carried out, described above, the value in memory unit 52 will recycle from a very small value to a very large value in the same manner that a binary counter recycles when it goes to zero. Since it is desired to always store positional data in the encoder processing system in sign-and-magnitude form to facilitate displaying this data, a correction must be made when a negative overflow occurs. This is done in the following manner.

Since, as stated above, the negative overflow condition is not determined until all digits have been processed, an extra cycle is required. At the end of processing of the eighth digit when a negative overflow condition occurs, the sign bit is changed and the negative overflow bit is set by status logic 124. During the next process cycle for that axis, ROM 120 causes the decimal value 101 to be substracted from the three least significant digits 100F-100H of the positional value stored in memory 52. The purpose of this is to preserve the roundoff data during the following nines-complement operation. The value 101 (which equals the capacity of the hidden roundoff register plus one) is the correction required to make the roundoff correct for all sign and value combinations. Also, in response to a set negative overflow bit, the output of AU 56 is applied to memory multiplexer 50 in nines-complement form for each digit in the positional value stored. At the end of the process cycle when all eight digits have been processed, the negative overflow bit in status register 80 is reset by status logic 124.

The result of the process described above is that when the positional value stored by the encoder processor system goes through zero, the positional data is still stored in sign-and-magnitude form which is displayed as described above. Since the sign and overrange status bits are not available at the output of multiplexer 50 for display as is the rest of the positional data maintained by the system, the sign and overrange displays 126 data comes directly from status registers 80.

It should be appreciated that the particular embodiment of the invention disclosed herein can be easily modified by one of ordinary skill in the art for use in different applications as mentioned throughout the description, without departing from the essence of the invention. Therefore, it is not intended to limit the invention by what has been shown or described, except as indicated in the following claims.

What is claimed is:

1. A system for processing signals from a plurality of positional encoders indicating the movement or non-movement thereof, to provide output signals representative of the position of each of the encoders, said output signals being selectively representative of encoder position in one of at least two different sets of dimensional units, comprising:
storage means for storing data representative of each digit of a plurality of first multi-digit values, each value being representative of a first position of a respective encoder;
means for sequentially retrieving from said storage means said data representative of each of the stored digits;
means for selecting the dimensional units in which said encoder positions are to be represented and for producing a signal representative thereof;
means periodically operative in response to the signals from the encoders for individually processing the retrieved data representing each digit of said plurality of multi-digit values to produce data representative of each digit of a plurality of subsequent multi-digit values representing the subsequent position of each of the encoders, said processing means including:
clock means for producing signals indicating which digit of which multi-digit value is being processed by the processing means;
control means, operative in response to the signals from said selecting means and to the signals from said plurality of encoders, for determining proper values to be added to or subtracted from each of the digits as the data representative thereof is sequentially retrieved by said retrieving means; and
means responsive to said control means for adding and subtracting said proper values to said first plurality of multi-digit values to produce said subsequent plurality of multi-digit values; and
means operative for storing in the storage means the data representative of each of the digits of the subsequent multi-digit values representing the then present position of each of the encoders.

2. The system of claim 1 further comprising means for display, including:
a plurality of display devices each operative to display a digit; and
means responsive to the signals from the clock means and to the sequentially produced data representative of each digit from the processing means for activating each of the display devices so that the multi-digit values representative of the positions of the encoders are displayed.

3. The system of claim 2 further including means for inserting signals representative of a preselected encoder position, including:
means for producing selectable signals representative of each digit of a multi-digit value representative of the preselected encoder position; and
means for causing the selectable signals to be stored in the storage means in place of the signals representative of the corresponding digit of the multi-digit value from the processing means so that the signals in the storage means representative of the encoder position are replaced by signals representative of the preselected encoder position.

4. The system of claim 3 wherein the digits processed by the means for processing begin with the least significant digit of each multi-digit value and proceed sequentially through the most significant digit of each multi-digit value.

5. The system of claim 4 wherein the different dimensional units include English units and metric units.

6. The system of claim 1 wherein the control means further comprises:
read-only-memory means, wherein the appropriate values to be added to or subtracted from each digit of the first multi-digit value are determined by applying to the read-only-memory means:
the clock signals representative of which digit of which multi-digit value is being processed;
signals, from the means for retrieving, representative of the value of the digit being processed;
signals from the corresponding encoder representative of movement or non-movement thereof;
signals representative of the units of measurement in which encoder movements are to be represented; and
signals representative of whether the processing of previous digits results in a value being carried over which must be added to or subtracted from the present digit;
the output signals from the read-only-memory means being representative of the value to be added or subtracted.

7. A system for processing signals from a positional encoder to provide an output signal representative of encoder position, said output signal being selectively representative of said encoder position in one of at least two different sets of dimensional units, comprising:
means for storing data representative of each digit of a first multi-digit value representative of the encoder position;
means for retrieving said data from said storing means sequentially from the least significant digit through the most significant digit;
means for selecting the dimensional units in which said multi-digit value is to represent said encoder position, and producing a signal representative thereof;
means for processing data representative of each digit in response to subsequent signals from the encoder such that the first multi-digit value is updated to be representative of the subsequent encoder position, said processing means including:

clock means for producing signals indicating which digit of the multi-digit value is being processed by the processing means;

read-only-memory means for determining a proper value to be added to or subtracted from each digit of the first multi-digit value in response to: signals from said clock means, signals from said selecting means, signals from the retrieving means representative of the digit being processed, and the signals from said positional encoder;

means responsive to said read-only-memory means for adding and subtracting said proper value to the first multi-digit value to produce an updated multi-digit value representative of the subsequent encoder position; and means for storing in the storing means data representative of each digit of the updated multi-digit value after processing thereof by said processing means.

* * * * *